United States Patent
Moench et al.

(10) Patent No.: US 6,897,627 B2
(45) Date of Patent: May 24, 2005

(54) CONTROL DEVICE FOR DUAL-MOTOR WIPER SYSTEMS

(75) Inventors: Jochen Moench, Sinzheim (DE); Hartmut Krueger, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/493,940

(22) PCT Filed: May 30, 2003

(86) PCT No.: PCT/DE03/01766

§ 371 (c)(1),
(2), (4) Date: Apr. 28, 2004

(87) PCT Pub. No.: WO2004/043751

PCT Pub. Date: May 27, 2004

(65) Prior Publication Data

US 2004/0245954 A1 Dec. 9, 2004

(30) Foreign Application Priority Data

Nov. 14, 2002 (DE) .......................... 102 53 007

(51) Int. Cl.⁷ ................................. B60S 1/08
(52) U.S. Cl. ..................... 318/111; 318/282; 318/293; 318/443

(58) Field of Search ............... 318/111–113, 280–286, 318/288, 289, 291, 293, 294, 443–444

(56) References Cited

U.S. PATENT DOCUMENTS

| | | | | |
|---|---|---|---|---|
| 3,721,878 A | * | 3/1973 | Gumbert | 318/443 |
| 4,638,222 A | * | 1/1987 | Sawaki | 318/111 |
| 4,670,693 A | * | 6/1987 | Kazami et al. | 318/112 |
| 4,670,695 A | | 6/1987 | Licata | 318/443 |
| 4,705,997 A | * | 11/1987 | Juzswik | 388/811 |
| 6,583,591 B2 | * | 6/2003 | Echols et al. | 318/112 |

FOREIGN PATENT DOCUMENTS

| | | |
|---|---|---|
| EP | 0 241 403 A | 10/1987 |
| EP | 1 034 991 A | 9/2000 |

* cited by examiner

Primary Examiner—Bentsu Ro
(74) Attorney, Agent, or Firm—Michael J. Striker

(57) ABSTRACT

An electronic triggering device for a two-motor wiper system with two electric motors is proposed, in which the triggering device includes a parallel circuit of three half bridges; one of the three half bridges intended for triggering both electric motors in common. A method for triggering such a triggering device is also proposed.

8 Claims, 2 Drawing Sheets

CONTROL DEVICE FOR DUAL-MOTOR WIPER SYSTEMS

BACKGROUND OF THE INVENTION

The invention relates to an electronic triggering device for a two-motor wiper system with two electric motors, in particular for a motor vehicle, and to a method for triggering such a triggering device.

Lately, so-called two-motor wiper systems have been used as windshield wiper systems for motor vehicles. Conventional wiper systems of this kind each have one electric motor for the drive on the driver's side and on the front passenger's side, preferably DC motors, and each of the electric motors is triggered by a separate control unit with a set of control electronics. Each set of control electronics includes an H bridge with power electronics switch elements, in particular power MOSFETs. Each of the H bridges includes a parallel circuit of two half bridges, and each of the half bridges has a series circuit of two switch elements. Thus a conventional set of control electronics has four switch elements for each motor of a two-motor wiper system. The power electronics for both motors together accordingly include a total of eight switch elements.

With these eight switch elements, it is possible to change the sign of the control voltage that drives the electric motors in terms of its polarity and thus to achieve a reversal of the direction of rotation of the motor. Moreover, with the aid of a selectable switching or clocking frequency for the switch elements, it is possible to regulate the effective magnitude of the supply voltage and thereby the rpm of the electric motors.

SUMMARY OF THE INVENTION

It is the object of the present invention to furnish a more-economical set of triggering electronics for a two-motor wiper system.

This object is attained according to the invention with an electronic triggering device and with a method for operating such a triggering device provided with new features of the present invention.

According to the invention, the electronic triggering device for a two-motor wiper system includes three half bridges, and each of the three half bridges has a series circuit comprising two switch elements. The three half bridges are each connected parallel to a direct voltage supply for the two electric motors. Each of the electric motors is triggered by two half bridges, and a middle one of the half bridges triggers both electric motors jointly, i.e., in common.

Advantageously, the number of switch elements is reduced to six, compared with conventional triggering electronics known from the prior art. By eliminating two switch elements, a more-economical embodiment of power end stages of control units for two-motor wiper systems can be achieved.

Advantageously, with the aid of the triggering device of the invention, it is possible to reduce both the time and cost for production, assembly and maintenance in two-motor wiper systems.

Because of the reduced number of power semiconductor switch elements, it is furthermore advantageously possible to lengthen the average length of time between statistically occurring instances of failure (MTBF time, or mean time between failures).

Increased reliability of the triggering device of the invention can thus be achieved. Moreover, because of the reduced number of switch elements, energy consumption by the triggering device of the invention can be lowered compared to conventional triggering devices.

A first preferred embodiment of the triggering device of the invention provides simultaneous triggerability of both electric motors by the middle half bridge.

A further preferred embodiment of the electronic triggering device provides triggerability in alternation of the two electric motors by the middle half bridge.

The invention will be described in further detail below in conjunction with the accompanying drawings.

DESCRIPTION OF THE PREFFERRED EMBODIMENTS

Figure 1:
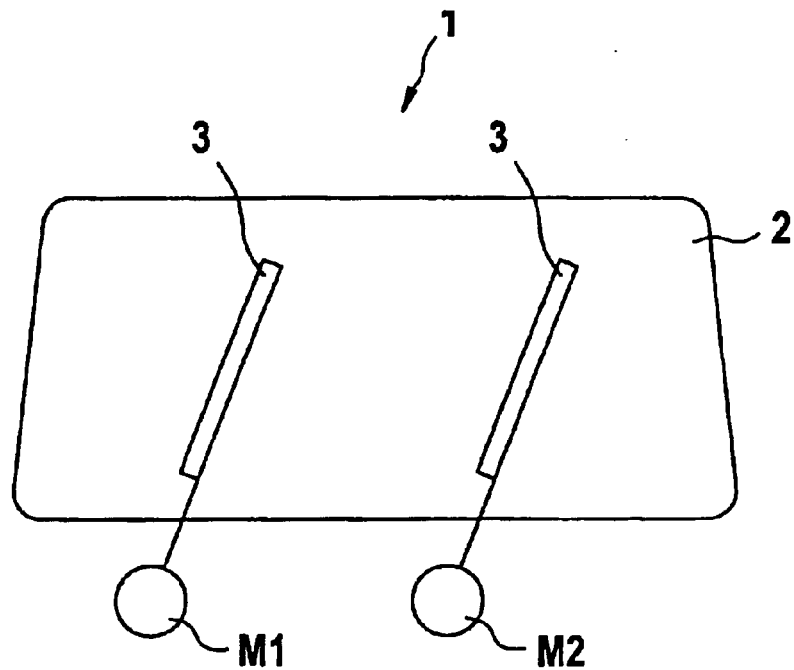
FIG. 1, a schematic illustration of a two-motor wiper system of a motor vehicle.

FIG. 1 shows a schematic illustration of a two-motor wiper system for a window 2 of a motor vehicle. Two wiper arms 3 are driven by two electric motors M1, M2, and each of the wiper arms 3 is driven by a separate electric motor.

Figure 2:
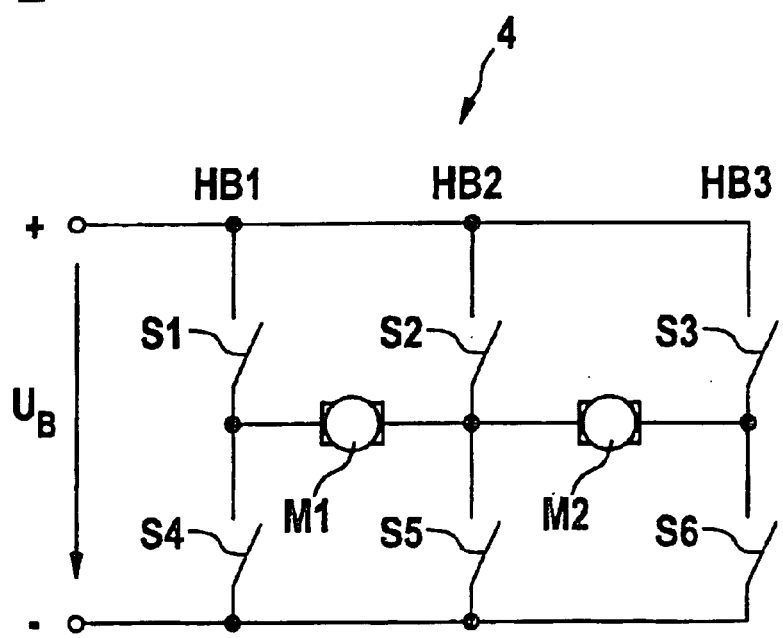
FIG. 2, a basic circuit diagram for one embodiment of the triggering device of the invention.

One embodiment of the triggering device of the invention is shown in FIG. 2. This drawing shows a two-motor wiper system 1 of a motor vehicle with two direct current motors M1, M2 and an electronic triggering device 4 of the invention. The triggering device 4 includes three half bridges HB1, HB2, HB3, and a first half bridge HB1 includes a series circuit of a first and a fourth switch element S1, S4. A second, middle half bridge HB2 includes a series circuit of a second and a fifth switch element S2, S5. A third half bridge HB3 includes a series circuit of a third and a sixth switch element S3, S6. The switch elements S1, S2, S3, which are assigned with the positive voltage, are so-called high-side switches of the respective assigned half bridge. The switch elements S4, S5, S6, which are assigned to a ground potential, are so-called low-side switches of the respective half bridge.

The three half bridges HB1, HB2, HB3 are connected parallel to one another and to a supply voltage $U_B$ and ground potential, respectively, and one connection point is connected electrically conductively between a first switch element of each of the half bridges HB1, HB2, HB3 and a second switch element of the respective half bridges HB1, HB2, HB3, by one of the armature windings of each of the electric motors M1, M2. A connection point between the second switch element S2 and the fifth switch element S5 of the second half bridge HB2 is electrically conductively connected to one armature winding of each of the two electric motors M1, M2.

Thus each of the two electric motors M1, M2 is triggered by two half bridges each; a first electric motor M1 is triggered by the first and second half bridges HB1, HB2, and a second electric motor M2 is triggered with the aid of the second and third half bridges HB2, HB3. The second half bridge HB2 is accordingly embodied for triggering both electric motors M1, M2 jointly.

Figure 3:
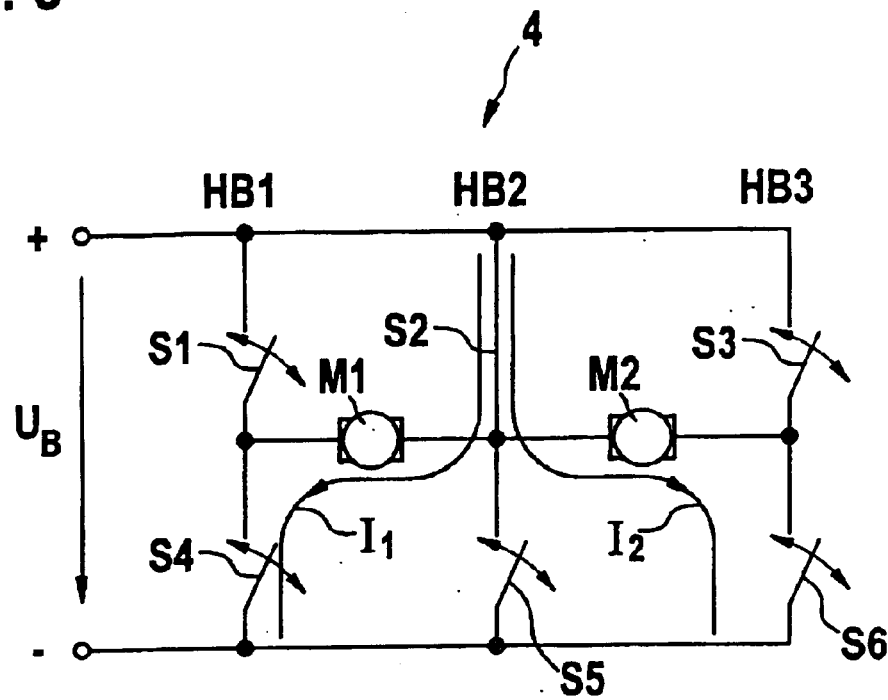
FIG. 3, a schematic explanation of a first preferred mode of operation of the triggering device of the invention.

FIG. 3 shows a schematic illustration of a first preferred mode of operation of the triggering device 4 of the invention. In it, the second, middle half bridge HB2 is used for simultaneously triggering both electric motors M1 and M2. Depending on the desired polarity of a control voltage with which the two electric motors are to be operated, and which assures a uniform direction of rotation of both motors, either the second switch element S2 or the fifth switch element S5 of the second half bridge will be closed. In FIG. 3, the second switch element S2 is shown closed, or in other words makes a circuit. The fourth switch element S4 of the first half bridge HB1 and the sixth switch element S6 of the third half bridge HB3 are operated in clocked fashion.

This means that depending on the clock frequency of the fourth and sixth switch elements S4, S6, which are driven in clocked fashion, the effective voltage magnitudes can be established for the two electric motors M1, M2. In clocking operation of the switch element, the respective other switch element is clocked diagonally oppositely from the same half bridge, so that a free-wheeling current can develop via the other switch element of the first and third half bridges HB1, HB3, the electric motor, and the conductively connected switch element of the second, middle half bridge HB2. In the exemplary embodiment shown, a current I1 can thus develop via the second switch element S2, the first electric motor M1, and the fourth switch element S4. A current I2 can furthermore flow via the second switch element S2, the second electric motor M2, and the sixth switch element S6.

With the mode of operation shown in FIG. 3, it is possible in a simple, convenient way to control the rpm of the electric motors M1, M2. Because of the fact that the second half bridge HB2 simultaneously triggers both electric motors, an increased current flow through the second half bridge HB2 can be achieved. It is therefore advantageous that the switch elements of the second half bridge HB2 are dimensioned more powerfully than the switch elements of the first and third half bridges HB1, HB3.

The direction of rotation of the electric motors M1, M2 can be reversed in the exemplary embodiment shown in FIG. 3 simply by providing that instead of the second switch element S2, the fifth switch element S5 of the second half bridge HB2 is made conducting. Moreover, this requires that the first switch element S1 of the first half bridge HB1 and the third switch element S3 of the third HB3 be operated in clocked fashion.

In the embodiment shown in FIG. 3 of the triggering device 4 of the invention, it is also possible for one of the switch elements of the second half bridge HB2 to be operated in clocked fashion and for one switch element of each of the first and third half bridges HB1, HB3 to be operated in conductively connected fashion. This is especially advantageous whenever especially precisely matching control voltages for the electric motors M1, M2 are to be attained.

Figure 4:
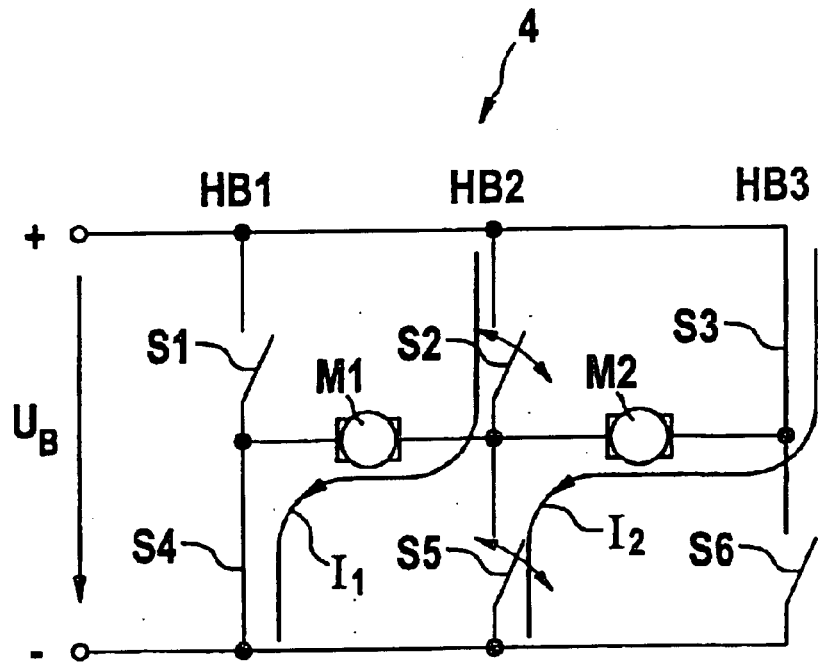
FIG. 4, a schematic explanation of a further preferred mode of operation of the triggering device of the invention.

FIG. 4 shows a schematic illustration of a further preferred mode of operation of the triggering device 4 of the invention. The second half bridge HB2 serves the purpose of triggering the two electric motors M1, M2 jointly and in alternation. The second half bridge HB2 is operated in clocked fashion, while conversely the first and third half bridges HB1, HB3 are not operated in clocked fashion. This means that whichever switch element of the first and third half bridges HB1, HB3 defines the polarity of the operating voltage for the electric motors M1, M2 is connected permanently conductively.

In the embodiment shown in FIG. 4, the fourth switch element S4 of the first half bridge HB1 and the third switch element S3 of the third half bridge HB3 is connected permanently conductively. The second switch element S2 and the fifth switch element S5 of the second half bridge HB2 are operated diagonally oppositely in clocked fashion; that is, the second switch element S2 and the fifth switch element S5 are each diametrically oppositely opened or connected conductively. As a result, via a current I1 can develop via the second switch element S2, the first electric motor M1, and the fourth switch element S4. A current I2 can furthermore develop via the third switch element S3, the second electric motor M2, and the fifth switch element S5.

In the preferred mode of operation shown in FIG. 4, the effective control voltage at which each of the electric motors M1, M2 can be maximally triggered is divided in accordance with the activation ratios of the high-side and low-side switches of the second half bridge HB2. Thus for each electric motor, effectively only a certain percentage of the supply voltage $U_B$ is available. At an activation ratio of 50:50, for instance, half the supply voltage $U_B$ is thus available for each of the two electric motors M1, M2.

What is claimed is:

1. An electronic triggering device (4), for a two-motor wiper system having two electric motors (M1, M2) for a motor vehicle, in which the triggering device (3) has three triggering units (HB1, HB2, HB3), and each of the triggering units (HB1, HB2, HB3) includes a first switch element (S1, S2, S3) and a second switch element (S4, S5, S6), and one first switch element (S1, S2, S3) and one second switch element (S4, S5, S6) is connected in a series circuit, and the three triggering units (HB1, HB2, HB3) are connected in parallel between two voltage potentials, and one connection point is connected between each first switch element (S1, S2, S3) and each respective second switch element (S4, S5, S6), and one connection point of a first triggering unit (HB1) is connected to a first terminal of a first electric motor (M1), one connection point of a second triggering unit (HB2) is connected to a second terminal of the first electric motor (M1), and one connection point of a third triggering unit (HB3) is connected to a second terminal of the second electric motor (M2), wherein the connection point of the second triggering unit (HB2) is connected electrically conductively to a first terminal of the second electric motor (M2).

2. The triggering device of claim 1, wherein the two electric motors (M1, M2) are triggerable simultaneously by the second triggering unit (HB2).

3. The triggering device of claim 1, wherein the two electric motors (M1, M2) are triggerable in alternation by the second triggering unit (HB2).

4. A method for triggering two electric motors (M1, M2) of a two-motor wiper system (1) of a motor vehicle, in which half bridges (HB1, HB2, HB3) are used for triggering and a first motor (M1) is triggered with a first and second half bridge (HB1, HB2), wherein a second motor (M2) is triggered with the second half bridge (HB2) and with a third half bridge (HB3).

5. The method of claim 4, wherein the two motors (M1, M2) are triggered simultaneously with the second half bridge (HB2).

6. The method of claim 5, wherein a first switch element of the second half bridge (HB2) is open, and a second switch element of the second half bridge is connected conductively, either permanently or in clocked fashion.

7. The method of claim 4, wherein the two motors (M1, M2) are triggered in alternation with the second half bridge (HB2).

8. The method of claim 7, wherein the first switch element of the second half bridge is connected conductively diametrically oppositely in clocked fashion, and one of the switch elements of each of the first and third half bridges (HB1, HB3) is connected permanently conductively.

* * * * *